Oct. 23, 1956     J. H. STINSON, JR., ET AL     2,768,029
POP-UP CONVERSION KIT FOR UNDERGROUND
SYSTEM FIXED SPRINKLER HEADS
Filed March 22, 1954     2 Sheets-Sheet 1

INVENTORS:
JOHN H. STINSON, JR.
JUDGE E. ROSANDER
BY Bertha L. MacGregor
ATTORNEY Oct. 23, 1956  J. H. STINSON, JR., ET AL  2,768,029
POP-UP CONVERSION KIT FOR UNDERGROUND
SYSTEM FIXED SPRINKLER HEADS
Filed March 22, 1954  2 Sheets-Sheet 2

INVENTORS:
JOHN H. STINSON, JR.
JUDGE E. ROSANDER

BY Bertha L. MacGregor

ATTORNEY

_2,768,029_

POP-UP CONVERSION KIT FOR UNDERGROUND SYSTEM FIXED SPRINKLER HEADS

John H. Stinson, Jr., and Judge E. Rosander, Denver, Colo.

Application March 22, 1954, Serial No. 417,832

5 Claims. (Cl. 299—61)

This invention relates to an adapter kit for use in converting non-pop-up type lawn sprinkler heads in underground irrigation systems to the pop-up type, whereby sprinkler heads initially installed to project above ground both when at rest and in operation can be located below the surface of the ground to be flush therewith when at rest and to project above ground level only when in operation.

Sprinkler heads of the non-pop-up type necessarily are installed to project above ground level and therefore interfere with efficient lawn cutting unless they are disconnected from their underground conduits and removed temporarily from their installed positions. This procedure is inconvenient and time consuming.

The main object of our invention is to eliminate these objections and to convert such sprinkler heads to the pop-up type at low cost and without discarding any major part of the existing equipment, the converted heads being located below ground level when at rest and covered in such manner that they do not interfere with lawn cutting.

Another object of our invention is to provide a covered container and the parts required for making the described conversion of sprinkler heads, assembled in the form of an adapter kit unit, in which the container, its cover and the enclosed parts are all utilized as parts of a converted sprinkler head of the pop-up type.

Another object of the invention is to produce an adapter kit for the purposes stated, which is compact, economical to manufacture, and efficient for converting different types of sprinkler heads to the pop-up type.

Figure 5:
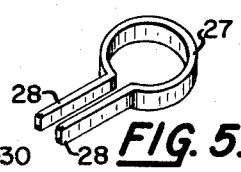
Figures 6, 7, 8, 9:
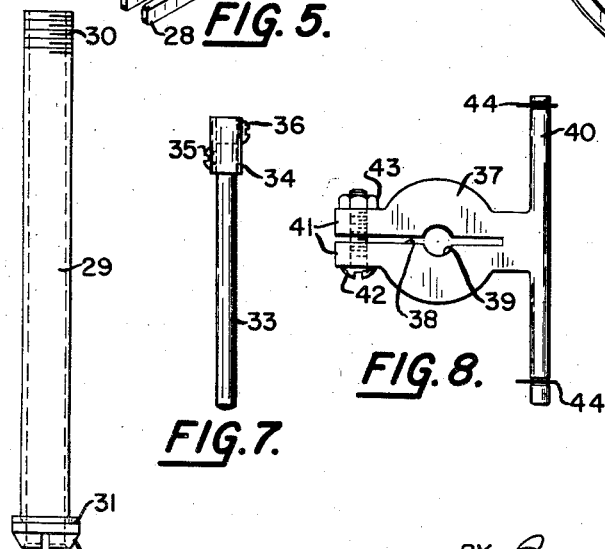

Figs. 5 to 9, inclusive, show parts contained within the adapter kit, said parts being designed to be added to or substituted for existing mechanisms in sprinkler heads of the rotary non-pop-up type; Fig. 5 being a perspective view of one of two identical nozzle control clips; Fig. 6, an elevational side view of a sprinkler head stem; Fig. 7 an elevational side view of a control arm; and Figs. 8 and 9, respectively, top plan and side elevational views of a bracket adapted to be mounted on a sprinkler head and connected to the cover of the container kit.

Figure 10:
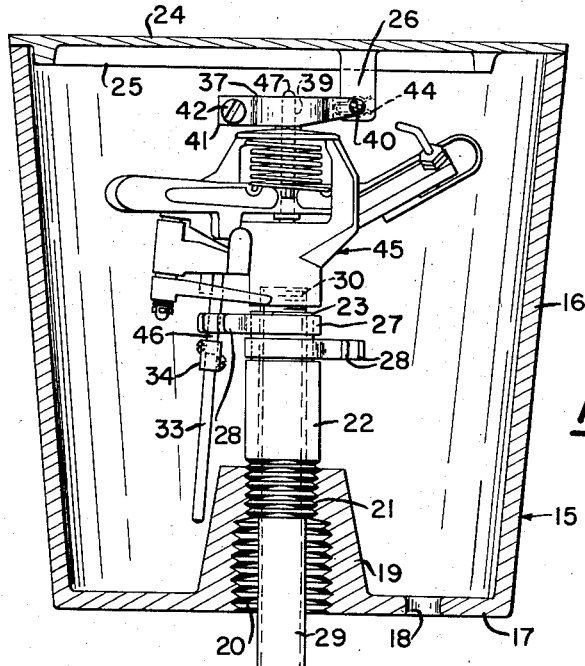

Fig. 10 is a vertical sectional view of the adapter kit container and cover embodying our invention, showing in elevation therein a sprinkler head of the non-pop-up type which has been converted to the pop-up type by means of the adapter kit parts shown separately in Figs. 5 to 9, inclusive; said sprinkler head being shown in its inoperative or "rest" position.

Figure 11:
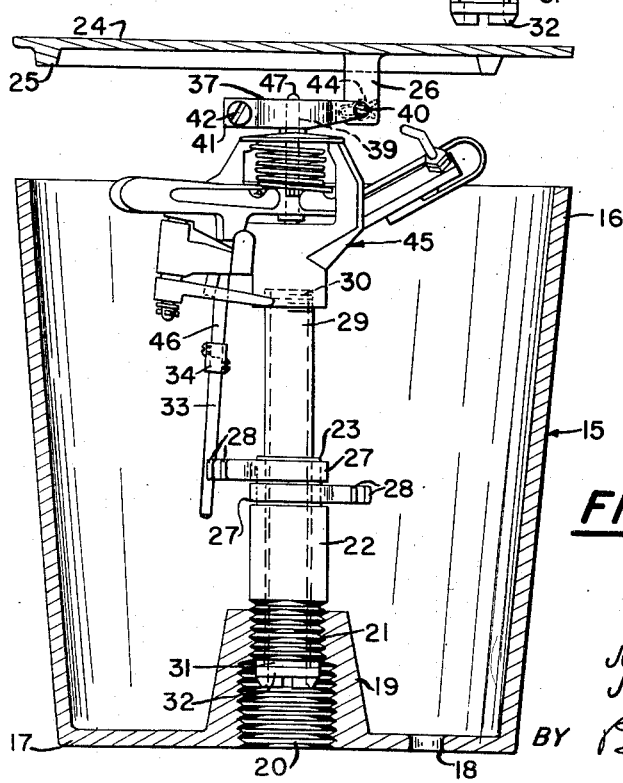

Fig. 11 is a view similar to Fig. 10, showing the sprinkler head and parts in raised, operative position.

In the embodiment of our invention shown in the drawings, we have illustrated our adapter kit for use in converting a conventional non-pop-up rotary sprinkler head to the pop-up type by substituting and adding the parts herein described, and by mounting the converted head in the covered holder cup 15 which also serves as the kit container for enclosing the said parts as a marketable unit.

The holder cup or container 15 is made of metal, such as aluminum or other suitable material, and is circular in horizontal cross section and open topped. Its side walls are indicated at 16, and its bottom 17 is provided with drain holes 18 and a central raised boss 19. Said boss is internally bored and screw threaded at 20 and 21, the diameter of the threaded portion 20 being greater than the portion 21. The form of the boss 19 is that of a truncated cone, its diameter at the top being smaller than at its bottom.

Figure 1:
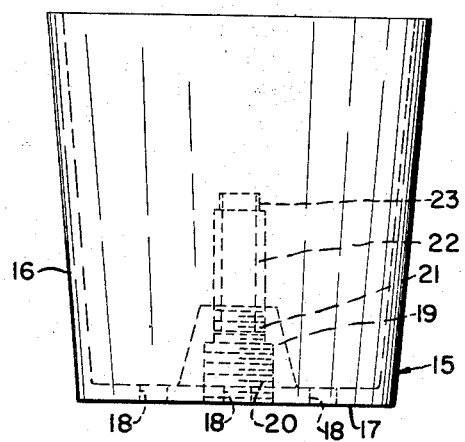
Fig. 1 is an elevational side view of the container which is part of the adapter kit embodying our invention.
Figure 2:
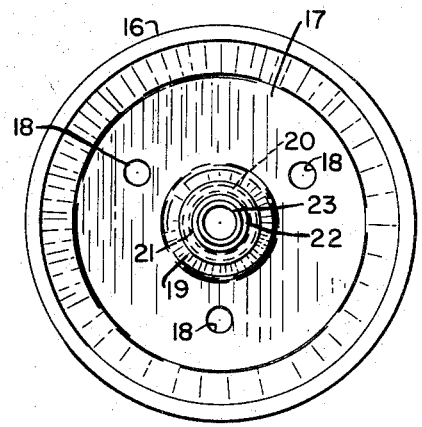
Fig. 2 is a top plan view of the open top container as it appears when looking down into the container.

A hollow shaft 22, externally screw threaded at its lower end, is mounted by means of said end in the threaded portion 21 of the boss 19 as shown in Fig. 1. The upper end 23 of said hollow shaft 22 is externally reduced to provide a shoulder on said shaft 22.

The threaded portion 20 of the boss 19 provides means for connecting the underground conduit to the container 15 to supply water to the sprinkler head, as will be explained hereinafter.

Figure 3:
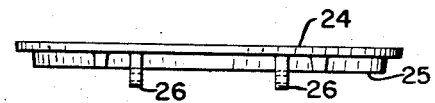
Fig. 3 is an elevational side view of the container cover.
Figure 4:
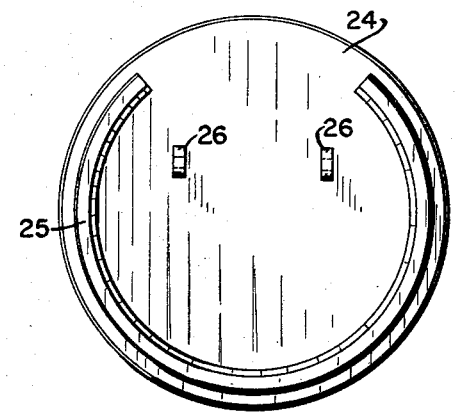
Fig. 4 is a bottom plan view of the cover.

The cover 24 is flat topped and of the same diameter as the container walls 16 at their upper edge on which the cover rests. The flange 25 depends from the cover as shown in Figs. 3 and 4, and fits within the container walls 16. A pair of horizontally apertured ears 26 also depend from the lower surface of the cover 24.

In Fig. 5 is shown one of two identical control clips intended to be adjustably mounted on the sprinkler head. The clip comprises a loop portion 27 terminating in a pair of substantially parallel arms 28 which are longer than the arms of conventional control clips such as are used on non-pop-up rotary sprinkler heads for determining the extent of the rotary movement of the head.

The stem 29 as shown in Fig. 6 is a hollow shaft, screw threaded externally at its upper end as indicated at 30. A washer 31 rests on the washer seat 32 at the lower end of the stem 29. This stem is longer than the stems of conventional sprinkler heads such as it is our purpose to convert to pop-up type heads. Preferably the stem is increased about 1⅞ inches in length as compared to the stem it is intended to replace, to allow for raising of the sprinkler head 45 and cover 24.

A control arm 33, shown in Fig. 7, is provided with a sleeve 34 which is secured to the sleeve 33 by any suitable means, as by a screw 35 or by welding, the sleeve being positioned so that about half of it projects above the upper end of the control arm 33. The projecting end of the sleeve is apertured and threaded to receive a set screw 36 whereby the arm 33 is intended to be secured to the existing control arm of a conventional sprinkler head for increasing the length thereof.

In Figs. 8 and 9 we have shown a special bracket designed for mounting on the upper end of a sprinkler head, to be connected to the cover of our container 15, whereby the cover will be lifted with the sprinkler head above the upper edge of the container walls 16 when the converted sprinkler head is raised. Said bracket comprises a disc 37 provided with a slot 38 open at one end, and a round opening 39 between the ends of the slot and communicating therewith. The disc 37 is extended at its unslotted portion to provide a support for a horizontally disposed rod 40 secured to the bracket. The slotted portion of the disc has apertured extensions 41 which can be drawn together by a bolt 42 and nut 43 for mounting the bracket on the sprinkler head as will be explained. Wire retainer clips 44 on the grooved end portions of the rod 40 prevent slippage of the rod after said rod has been inserted in the apertured ears 26 of the cover.

The parts shown in Figs. 5 to 9, inclusive, are packaged within the container 15, closed by the cover 24, to form an adapter kit which may be marketed as a unit to owners or users of underground lawn sprinkler systems provided with non-pop-up heads for the purpose of converting said systems to the pop-up type. In the conversion the entire kit including the container and cover and the enclosed parts are utilized in the converted installation. In the embodiment herein described, for converting the rotary non-pop-up sprinkler to the pop-up type, the control clips 27 and the hollow stem 29 are substitution parts, while the extension control arm 33, container 15 and cover 24 are additional parts.

In Figs. 10 and 11 we have illustrated how the adapter kit, including the container, cover and enclosed parts, is utilized in converting a conventional sprinkler head to the pop-up type. The sprinkler head is indicated as a whole at 45. The short control arm 46 which is a part of the conventional mechanism is lengthened by securing thereto the control arm 33 of our adapter kit equipment. This is done by slipping the sleeve 34 over the arm 46 and tightening the set screw 36. The short hollow stem which is a part of the conventional sprinkler head has been removed from the head 45 and replaced by the longer stem 29 of Fig. 6. The rotation control clips 27—28 are positioned on the hollow shaft 22—23 (Figs. 1, 10 and 11), in such position that they can be engaged by the extended control arm 33 when the sprinkler head is in the raised operative position shown in Fig. 11.

The bracket 37 shown separately in Figs. 8 and 9 is mounted on the sprinkler head as shown in Figs. 10 and 11, by positioning the bracket on the pin 47 and then drawing the two members 41 together by means of the bolt 42 and nut 43. The rod 40 is inserted into the apertured ears 26 of the cover, first one end of the rod being inserted and moved longitudinally of the rod so that the opposite end can be inserted in the other ear 26, and then the wire retainer clips 44 are placed in position on the rod near its grooved ends to prevent displacement of the cover 24 relatively to the rod 40. Thus the cover moves with the sprinkler head into the operative position shown in Fig. 11 under influence of water under pressure passing upwardly through the stem 29, and moves downwardly with the sprinkler head into the inoperative position shown in Fig. 10 when the water is turned off.

Water is supplied from the underground conduit of the system through a coupling connected to the screw threaded portion 20 of the boss 19 on the bottom of the container 15. The water passes upwardly through the stem 29 and its pressure lifts the cover 24 and sprinkler head 45, causing the stem 29 to slide upwardly in the boss 19 and hollow shaft 22 rising from said boss. The discharge nozzle rotates with the head in the conventional manner in an arcuate path defined by the positioning of the control clips 27 with which the control arm 33 contacts as shown in Fig. 11. When the water pressure is relieved the parts drop automatically to the inoperative position shown in Fig. 10.

The substitution of the control clips 27 and the elongated stem 29 for conventional parts of the sprinkler head, and the addition of the extension control arm 33, the bracket 37, the container 15 and cover 24, enable the head 45 to be raised automatically for operation above ground and to be lowered to inoperative position where it will not interfere with lawn cutting.

The adapter kit parts described herein may be modified as required for use with different types of sprinkler heads of the non-pop-up type for the purpose of converting them to the pop-up type, and such changes in form and dimensions are within the scope of our invention.

We claim:

1. A pop-up conversion kit for underground system fixed sprinkler heads comprising a sprinkler head, a container having side walls and a centrally apertured bottom, means on said apertured bottom for connecting the container to the conduit of an irrigation system, a hollow shaft mounted in and rising from the apertured bottom, a shoulder on the upper portion of the shaft, said shaft loosely supporting the sprinkler head within the container, a cover closing the container top, a bracket, means on the bracket detachably connecting it to the sprinkler head and to said cover, an elongated hollow stem connected at its upper end to the sprinkler head slidable longitudinally in said hollow shaft, a control arm on the sprinkler head, and cooperating control means mounted on the shoulder of the hollow shaft for engagement by the control arm.

2. The kit defined by claim 1 in which the cover has a flat top and a pair of spaced apart apertured ears depending from its bottom surface, and said bracket comprises a disc provided with means for fastening it to the top of the sprinkler head and a horizontal rod on the disc adapted to be inserted in the apertured ears of the said cover.

3. A pop-up conversion kit for underground system fixed sprinkler heads comprising a sprinkler head, a container having side walls and an externally flat centrally apertured bottom, a centrally apertured boss rising from said bottom surrounding the aperture, means on the boss for connecting the container to the conduit of an irrigation system, a hollow shaft rising from said boss, a shoulder on the upper portion of the shaft, said shaft loosely supporting the sprinkler head within the container, a cover closing the container top, a bracket, means on the bracket detechably connecting it to the sprinkler head and to said cover, an elongated hollow stem connected at its upper end to the sprinkler head slidable longitudinally in said hollow shaft and boss, a control arm, means on the arm detachably mounting it on said sprinkler head, and cooperating control means detachably mounted on the shoulder of the hollow shaft for engagement by the control arm.

4. The kit defined by claim 3 in which the control arm on the sprinkler head includes a hollow sleeve at one end of the arm and a set screw in the sleeve, and said cooperating control means on the hollow shaft comprises a pair of loop members having radially projecting arms.

5. The kit defined by claim 3 in which the cover has a flat top and a pair of spaced apart apertured ears depending from its bottom surface, and said bracket comprises a disc provided with means for fastening it to the top of the sprinkler head and a horizontal rod on the disc adapted to be inserted in the apertured ears of the said cover.

References Cited in the file of this patent
UNITED STATES PATENTS

| | | |
|---|---|---|
| 1,605,242 | Keys | Nov. 2, 1926 |
| 1,970,126 | Buckner | Aug. 14, 1934 |